United States Patent
Jampolsky

[11] 3,904,281
[45] *Sept. 9, 1975

[54] FLEXIBLE REFRACTING MEMBRANE ADHERED TO SPECTACLE LENS

[75] Inventor: Arthur Jampolsky, Belvedere, Calif.

[73] Assignee: Optical Sciences Group, Inc., San Rafael, Calif.

[ * ] Notice: The portion of the term of this patent subsequent to Dec. 21, 1988, has been disclaimed.

[22] Filed: June 28, 1971

[21] Appl. No.: 165,800

Related U.S. Application Data

[63] Continuation-in-part of Ser. No. 878,975, Dec. 8, 1969, Pat. No. 3,628,854, which is a continuation of Ser. No. 647,533, June 20, 1967, abandoned.

[52] U.S. Cl. ............... 351/159; 351/175; 350/211
[51] Int. Cl.² .................. G02C 7/08; G02B 3/08
[58] Field of Search ............ 351/175, 159, 44, 47; 350/211

[56] References Cited
UNITED STATES PATENTS

| | | | |
|---|---|---|---|
| 2,248,638 | 7/1941 | Merton | 350/162 R X |
| 2,511,329 | 6/1950 | Craig | 351/47 |
| 3,203,306 | 8/1965 | Lefferts | 350/211 |
| 3,628,854 | 12/1971 | Jampolsky | 351/175 |

*Primary Examiner*—David H. Rubin
*Attorney, Agent, or Firm*—Townsend and Townsend

[57] ABSTRACT

An ophthalmic device for treating or diagnosing an eye disorder comprising the combination of a spectacle lens and a flexible membrane formed of a transparent plastic and having opposed light transmitting surfaces, one of which is planarly smooth for being pressure-adhesively conformed to the ocular surface of the spectacle lens and the other of which has formed therein a plurality of stepped ridges constituting a Fresnel refracting surface which refracts the light transmitted through the lens and membrane in a manner enabling the treatment or diagnosis of the disorder.

12 Claims, 4 Drawing Figures

PATENTED SEP 9 1975
3,904,281
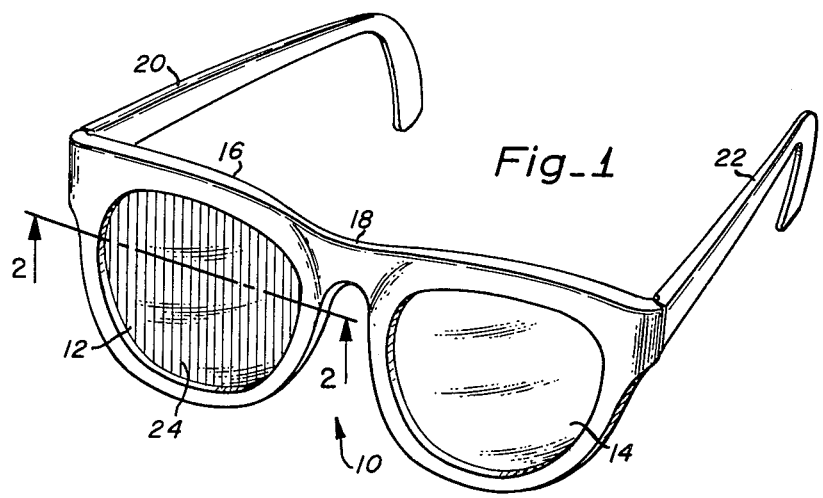
Fig_1
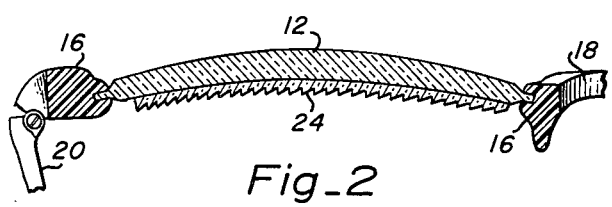
Fig_2
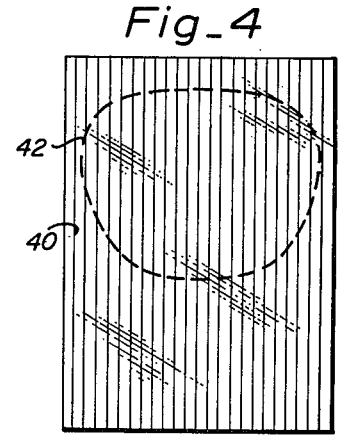
Fig_4
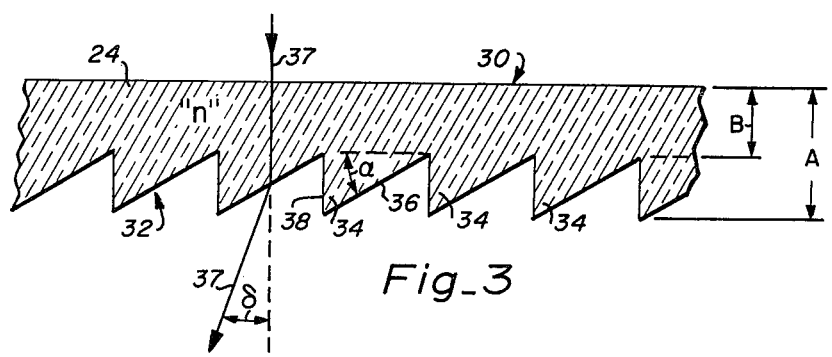
Fig_3
INVENTOR
ARTHUR JAMPOLSKY
*Boyken, Mohler, Foster & Schwab*
ATTORNEYS

FLEXIBLE REFRACTING MEMBRANE ADHERED TO SPECTACLE LENS

CROSS REFERENCE TO RELATED APPLICATIONS

This application is a continuation-in-part of U.S. application Ser. No. 878,975, filed Dec. 8, 1969, now U.S. Pat. No. 3,628,854, issued Dec. 21, 1971, which in turn is a continuation of U.S. application Ser. No. 647,533, filed June 20, 1967 and now abandoned.

BACKGROUND OF THE INVENTION

1. Field of the Invention

This invention relates to a thin, flexible, light transmitting membrane having refractive properties for attaching to a spectacle lens to refract the light transmitted through the membrane and the lens in a predetermined manner. More particularly it relates to the combination of such a membrane attached to a light transmitting surface of a spectacle lens for refracting the light passing therethrough in a manner enabling diagnosis and/or treatment of an eye disorder of the wearer of the spectacle lens. The term spectacle lens as used herein means any light refracting or nonrefracting (plano) element mounted in a frame suitable for wearing before the eyes.

A very important application of this invention is the diagnosis and treatment of strabismus and the invention will be described in particular detail in connection with this disorder. However, it is to be understood that the membrane of this invention has a much wider field of application and lends itself to a large variety of ophthalmic diagnostic and treatment problems.

2. Description of Prior Art

Heretofore, one aspect of diagnosing and nonsurgically treating strabismus was accomplished either by inserting thick prismatic lenses of different power in the optical path of the eye, or by supplementing the spectacle lens with rigid, clip-on prisms. The clip-on prisms are attached to the spectacle frame in front of the spectacle lens, and have been either Fresnel or normal prisms. Neither of these prior art devices have been found cosmetically acceptable by the wearer and observers.

In addition to being cosmetically unacceptable, both types of prior art devices also have been found subjectively objectionable because of field distortion. In the thick, prismatic lens, the required thickness is primarily responsible for the field distortion. In case of the anteriorly placed clip-on prisms, the distance between it and the eye is primarily responsible for field distortion.

Another disadvantage of the thick prismatic lens is that it has to be specially ground making it very expensive. One type of the nonsurgical treatment of strabismus usually involves a sequential modification of the prismatic correction from time to time. A specially ground prismatic lens has a fairly short useful life, and then must be discarded in favor of another lens of a different prismatic correction.

Also, in the past tinted shields or films have been attached to spectacle lenses to convert them to sunglasses. However, such conversion is not intended to clarify images seen through the spectacles. Rather it is intended to filter certain wavelengths from the light passing through the spectacles. Indeed, it is essential that such tinted shields or films not affect the direction or image-forming properties of the light entering or leaving the spectacle lens. Furthermore although the sunglasses art falls within the general ambit of optics, the diagnosis and treatment of eye disorders is essentially unrelated to that art. Ophthalmologists do not consult or follow the sunglasses art in seeking solutions to problems in their field because of the fundamental differences between their field and the sunglasses art.

SUMMARY OF INVENTION

This invention provides a flexible, conforming membrane for adhering to a spectacle lens, through which light rays are transmitted to an eye. The membrane has a pair of opposed surfaces, one of which is planarly smooth and adapted for surface-to-surface mating with and adherence to the spectacle lens. The opposite side of the membrane has a plurality of stepped ridges constituting a Fresnel refracting surface in it for refracting the light transmitted through it and the spectacle lens to the eye in a manner enabling treatment or detection of an eye disorder of the spectacle wearer. In most instances the membrane will be pressure-adhesively attached to the spectacle lens.

If the membrane is to be used to treat or diagnose strabismus the refractive elements of the membrane will constitute a Fresnel prism or Fresnel lens of predetermined refractive power. For diagnostic purposes, a plurality of such membranes are provided, each having a different refractive power. These membranes, being adapted to be pressed onto the spectacle surface, may be rapidly exchanged or rotated about an axis normal to the spectacle. For treatment purposes, the patient may be provided with a membrane suitable for his particular needs which is exchanged as necessary with a similar membrane of a different power, or the prism axis may be rotated differentially between the two eyes, or the image-forming properties of light through the respective spectacle elements may be altered independently either interdaily or intradaily.

It is therefore a primary object of this invention to modify the image-forming properties of light passing through spectacle lens to an eye by adhering a flexible membrane having predetermined refractive properties to the lens.

It is also a primary object of the present invention to provide an inexpensive method for modifying the optical characteristics of spectacles which may be practiced easily and readily by an ophthalmologist for diagnostic or training purposes and by the patient or other personnel for treatment purposes.

It is still another object of the present invention to provide a thin, flexible, conformable membrane which can be quickly and impermanently adhered to a spectacle lens and which functions as a lens supplement or deviating prism.

It is still a further object of the present invention to provide a spectacle lens-flexible refracting membrane combination having a specified prismatic power which is cosmetically acceptable.

It is a further object of the present invention to provide a membrane having the ability to refract the light passing through it, which is readily and easily attached to either surface of a spectacle lens, is inexpensive, and is readily replaceable when different diopter power is desired or required, or when the direction of deviation is to be altered transversely or longitudinally for treatment purposes.

Further objects and advantages of the present invention will become apparent to those skilled in the art to which the invention pertains as the ensuing description proceeds.

The features of novelty that are considered characteristic of this invention are set forth with particularity in the appended claims. The organization and method of operation of the invention itself will best be understood from the following description when read in connection with the accompanying drawings in which:

BRIEF DESCRIPTION OF THE DRAWINGS

FIG. 1 is a perspective view of a pair of spectacles having one embodiment of the flexible membrane of this invention affixed to one of the spectacle lenses;

FIG. 2 is a partial cross-sectional view taken along line 2—2 of FIG. 1;

FIG. 3 is an enlarged fractional cross-sectional view taken through a prismatically embossed membrane constructed in accordance with this invention when not pressed onto a lens;

FIG. 4 is a sheet of prismatically embossed membrane from which the spectacle lens applique of this invention may be cut.

Referring to FIGS. 1 through 3 of the drawings, there is shown a pair of spectacles 10 which conventionally comprise a pair of ophthalmic lenses 12 and 14 carried in a spectacle frame 16 having a bridge 18 and a pair of ear bows 20 and 22. In accordance with one embodiment of the present invention, a thin membrane 24, one side of which is embossed with a plurality of stepped ridges 34, is provided which is shown affixed to the posterior surface of lens 12 to refract the light passing through lens 12 and membrane 24 in a predetermined manner.

The stepped ridges 34 of membrane 24 are of the straight ridge type with progressively varying angles of inclination as the "step" recedes from the center of the lens. The basic design in which the angle of inclination varies progressively with the distance from the center was proposed by Fresnel in 1822 as a means of constructing large aperture lenses for lighthouses on the French coast, and lenses or prisms constructed with such a stepped surface are commonly designated Fresnel lenses or prisms. See, for example, the Encyclopaedia Britannica published by Encyclopaedia Britannica, Inc. (1965), Volume 13, pp. 953. Accordingly, optical membrane 24 embossed with stepped ridges 34 will be referred to as a Fresnel prism membrane.

Fresnel prism membrane 24 is made of a conformable, pressure-adherable, transparent plastic. As best seen in FIG. 3, it has a smooth, planar, light transmitting surface 30 which is pressure-adhesively affixed preferably to the posterior (ocular) lens surface so that the distance between the eye of the spectacle wearer and membrane 24 is a minimum, thereby reducing distortion in the visual field and reducing cosmetic objections for wearer and observer. Membrane 24 may be adhered to the front lens surface if desired, but as discussed above is preferably adhered to the ocular surface. The other surface 32 of membrane 24 has linear ridges 34 formed in it, each having an inclined face 36 and a perpendicular face 38.

The angle of inclination $\alpha$ of inclined face 36 is selected to provide a desired angular deviation $\delta$ of a light ray 37, which is defined as the power of the prism and is usually measured in "prism diopters." The angle of deviation $\delta$ of line of sight 37, the angle of inclination $\alpha$, and the index of refraction $n$ of the plastic material of membrane 24 are related by the expression:

$$\delta = \sin^{-1}(n \sin \alpha) - \alpha$$

Membrane thickness A, which is defined as the distance between surface 30 and the crests of ridges 34, and membrane thickness B, which is defined as the distance between surface 30 and the troughs of ridges 34, are selected in accordance with the following criteria. Thickness A should be of a magnitude which permits easy conformability of the membrane 24 to the lens 12 and is cosmetically acceptable. Within these criteria the limits of thickness A will depend upon the plastic material which is used and the desired power of the prism or lens. It is desirable to keep thickness A to a minimum to make it as cosmetically acceptable as possible. In most instances thickness A need not exceed about ¼ inch. More usually it will not exceed about 1/16 inch.

Thickness B should be of a magnitude which permits easy conformability of the membrane to the lens and affords sufficient tear strength. To some extent the minimum limit of thickness B is dependent upon the properties of the plastic material and the ability of the membrane manufacturer to emboss or otherwise form the ridges 34 in it without puncturing the membrane. Usually the minimum limit of thickness B will be about 0.001 inch. More usually it will range between about 0.01 and 0.02 inch. For instance it has been found that a thickness B of about 1/64 inch for a polyvinyl butyrate membrane is entirely satisfactory. The theoretical maximum of thickness B is a value measurably smaller than thickness A. In practice thickness B will usually not exceed more than about ¾ of the value of thickness A. Preferably, thickness B should be kept as small as possible since the smaller the dimension the greater is the possible beam-deviating ability of a given thickness A of the membrane.

The spacing between ridges 34 should be of a magnitude which is cosmetically acceptable. If the ridges are spaced far apart they are more easily seen than if they are spaced closely. For this reason it is desirable to keep this spacing as small as is practical. The minimum magnitude will also depend upon the plastic material used and the skill of the membrane manufacturer. Usually, this minimum will be about 0.001 inch. For most membranes the ridge spacing will be in the range of 0.002 to 0.25 inch.

The plastic material used to make the membranes should be optically clear, capable of accepting colored dyes and of being overprinted with opaque or transparent inks. In the form of a thin membrane it should have sufficient flexibility, strength and elasticity to permit handling as well as being able to conform to toric and spherical surfaces characteristic of most spectacle lenses. The greater the index of refraction the thinner the membrane that will be needed and, consequently, the easier to conform to doubly curved surfaces. The material should be embossable by pressure and/or temperature and be able to hold with excellent precision the embossed contours at ambient temperatures and under pressures encountered in storage, packaging and handling. Polyvinyl chloride is presently a preferred material.

The quality of conformability is further defined by stipulating that the membrane can be pressure-adhesively attached to the surface of a lens and remain there under the influence of the inherent attractive forces between the membrane and the lens. In this connection, it should also be realized that, for relatively thin films as the membrane herein, the elasticity or resilience should be sufficiently small so that the membrane adhesively adheres to the lens with a force greater than its inherent restoring force. This latter statement is applicable to restoring forces parallel and perpendicular to the plane of the membrane, the latter being controllable, at least to some extent, by the thickness A. These two physical properties are defined herein as "pressure-adhesively attachable" and "remaining conformed when adhesively bonded."

In the use of different plastic materials, there will be differences in conformability or in refractive properties which will modify the thicknesses A and B to some extent. In all instances it is necessary that the elastic restoring forces of the conformed film be less than the bond strength between the film and the spectacle lens. Otherwise the membrane will buckle or ripple and thus will not remain fully conformed to the lens.

While the above description of the membrane, and particularly the term "pressure-adhesively attachable," have primary reference to the process of pressing the membrane directly on the lens surface, it is to be understood that attachment may also be made by interposing a fluid film between the membrane and the lens surface which brings into play the physical phenomena of surface tension. Since surface tension is generally understood to result from molecules close to the surface of the liquid which exerts a force of attraction to the molecules of the surface of the solid, and thereby bring into play intermolecular forces, the term "adhesively affixed" is not limited to a bond between two solids, but includes the interposition of a liquid. Because the field of intermolecular adhesion is not entirely understood, and no uniformity exists relative to a definition, the term "adheseively attachable" as used herein, because it involves intermolecular forces, refers to both solid-adhesion and solid-liquid adhesion. If desired, appropriate adhesives may also be used to attach the membrane to the lens.

In the use of the invention, a determination is made of the necessary diopter required for the treatment or diagnosis of the specific case. Thereafter, a membrane is cut out of a suitable sheet of membrane stock, such as 40 shown in FIG. 4, of a specific diopter power and pressed onto the surface of the spectacle lens by finger pressure. If, for some reason it is desirable to change the prism diopter of the spectacle lens-membrane combination, such as is usually the case in progressive management of strabismus, the membrane in place is peeled off from the lens surface and a new membrane is pressed on.

As an alternative, the membrane-lens combination may be formed by placing a thin film of plastic material on the lens and then embossing the film in place.

In certain diagnosis or treatment, only a temporary modification of the spectacle lens may be desired, such being the case where a person is to train his visual apparatus, to relieve eye strain or modify the spectacles for temporary, special tasks. In such cases, the membrane is attached during the required use periods and thereafter is removed so that the wearer requires only a single pair of glasses.

While the prismatic membrane of the drawings has planar, inclined faces 36, is linearly ridged across the entire membrane, and has a constant thickness B, many modifications within the scope of this invention are readily made. For example, thickness B may be made to vary over the entire surface of the membrane in the manner of a prescription lens. Further, inclined faces 36 may be curved in cross section, or the ridges 34 may be circular instead of linear and thereby produce a Fresnel cylindrical or spherical lens. Of course, two or more of the above-described modifications may be combined readily to modify the image-forming properties of light passing through spectacle lenses in a manner not heretofore economically feasible. Since the membrane may be readily constructed by embossing or injection molding techniques, any of the above-mentioned modifications are readily and economically made.

I claim:
1. A device for use in combination with a spectacle lens through which light rays are transmitted to an eye, comprising:
   a. a thin, flexible membrane formed of light transmitting plastic material and having opposed surfaces;
   b. one of said opposed surfaces being planarly smooth and adapted for adherence in conforming relationship to a light transmitting surface of said spectacle lens and;
   c. the other of said opposed surfaces having formed therein light refracting elements, the refractive properties of which are substantially unaffected by such adherence and which refractive properties differ from those of said element for refracting the light rays transmitted by said element and said membrane to said eye in a predetermined manner.
2. The device of claim 1 in which:
   d. said light refracting elements constitute a Fresnel lens of predetermined prescription.
3. The device of claim 1 in which:
   d. said light refracting elements constitute a Fresnel prism of predetermined prescription.
4. A device for use in combination with a spectacle lens for diagnosing or treating a disorder of the eye comprising:
   a. a flexible membrane formed of light transmitting, plastic material and having opposed surfaces;
   b. one of said opposed surfaces being planarly smooth and adapted for adherence in conforming relationship to a light transmitting surface of said spectacle lens; and
   c. the other of said opposed surfaces having formed therein a plurality of stepped ridges which constitute a Fresnel refracting surface which refracts the light transmitted through said spectacle lens and said membrane to said eye in a manner enabling diagnosis or treatment of said disorder;
   d. the thickness of said membrane from said one of said opposed surfaces to the crests of said ridges being not greater than 1/4 inch;
   e. the minimum thickness of said membrane from said one of said opposed surfaces to the troughs of said ridges being 0.001 inch; and
   f. the minimum ridge spacing between said ridges being 0.001 inch.
5. The device of claim 4 wherein:
   g. said Fresnel refracting surface is a Fresnel prism.
6. The device of claim 4 wherein:

g. said Fresnel refracting surface is a Fresnel lens.

7. The device of claim 4 wherein:
g. said thickness of said membrane from said one of said opposed surfaces to the crest of the ridges is not greater than 1/16 inch;
h. said minimum thickness of said membrane from said one of said opposed surfaces to the troughs of said ridges being in the range of about 0.01 to 0.02 inch; and
i. the spacing between said ridges is in the range of 0.002 and 0.25 inch.

8. A device for ophthalmic use in treating a disorder of the eye comprising the combination of:
a. a spectacle lens of predetermined prescription;
b. a thin, flexible membrane formed of light transmitting plastic material and having opposed surfaces;
c. one of said opposed surfaces being planarly smooth and adhered in conforming relationship to a light transmitting surface of said lens through which said light rays are transmitted to said eye and;
d. the other of said opposed surfaces having formed therein light refracting elements, the refractive properties of which are substantially unaffected by such adherence and which refractive properties differ from those of said lens for refracting the light rays transmitted by said lens and said membrane to said eye in a predetermined manner.

9. A device for ophthalmic use in treating a disorder of the eye comprising the combination of:
a. a spectacle lens of predetermined prescription;
b. a flexible membrane formed of light transmitting plastic material and having opposed surfaces;
c. one of said opposed surfaces being planarly smooth and adhered to a light transmitting surface of said spectacle lens in conforming relationship thereto;
d. the other of said opposed surfaces having formed therein a plurality of stepped ridges which constitute a Fresnel refracting surface which refracts the light rays transmitted through said spectacle lens and said membrane to the eye in a manner enabling treatment of said disorder;
e. the thickness of said membrane from said one opposed surface to the crests of said ridges being not greater than ¼ inch;
f. the minimum thickness of said membrane from said one opposed surface to the troughs of said ridges being 0.001 inch; and
g. the minimum spacing between said ridges being 0.001 inch.

10. The device of claim 9 wherein:
h. said Fresnel refracting surface is a Fresnel prism.

11. The device of claim 9 wherein:
h. said Fresnel refracting surface is a Fresnel lens.

12. The device of claim 9 wherein:
h. said thickness of said membrane from said one of said opposed surfaces to the crest of the ridges is not greater than 1/16 inch;
i. said minimum thickness of said membrane from said one of said opposed surfaces to the troughs of said ridges being in the range of about 0.01 to 0.02 inch; and
j. the spacing between said ridges is in the range of 0.002 and 0.25 inch.

\* \* \* \* \*